United States Patent [19]

Fogle, Jr. et al.

[11] 4,246,734
[45] * Jan. 27, 1981

[54] FOLD DOWN MULTI-PURPOSE VEHICLE SEAT BACK CORE WITH INMOLDED METAL REENFORCING MEMBER

[75] Inventors: Alva E. Fogle, Jr., Buffalo Grove, Ill.; William E. Brennan, Troy; Jacque Passino, Orchard Lake, both of Mich.

[73] Assignee: K & M Plastics Inc., Elk Grove Village, Ill.

[*] Notice: The portion of the term of this patent subsequent to Mar. 6, 1996, has been disclaimed.

[21] Appl. No.: 951,031

[22] Filed: Oct. 18, 1978

Related U.S. Application Data

[63] Continuation-in-part of Ser. No. 845,845, Oct. 27, 1977, Pat. No. 4,142,757.

[51] Int. Cl.³ .................................................. E04C 1/00
[52] U.S. Cl. .............................. 52/309.16; 108/901; 296/63; 296/66; 297/DIG. 2
[58] Field of Search ................. 52/309.16; 296/63, 66; 108/51 R, 901; 297/DIG. 2

[56] References Cited

U.S. PATENT DOCUMENTS

| | | | |
|---|---|---|---|
| 3,467,032 | 9/1969 | Rowlands et al. | 108/901 |
| 3,470,598 | 9/1969 | Berthelsen | 52/309.16 X |
| 4,142,757 | 3/1979 | Fogle et al. | 297/DIG. 2 |

FOREIGN PATENT DOCUMENTS 320635 2/1970 Sweden ...................................... 108/51

Primary Examiner—William F. Pate, III

[57] ABSTRACT

A seat back core for a vehicle having a fold down seat which is also required to serve as a load floor.

The core is blow-molded and formed with a pair of parallel spaced walls having tying links extending between the walls to strengthen and rigidify the core but not to prevent flexure thereof. There is a peripheral closing wall around the core.

An elongate metal member is incorporated into the core at the time that it is blow-molded and becomes a permanent part of the core. It serves to limit the flexure of the core, provide additional strength and may serve as an anchor for securement of hardware.

12 Claims, 8 Drawing Figures

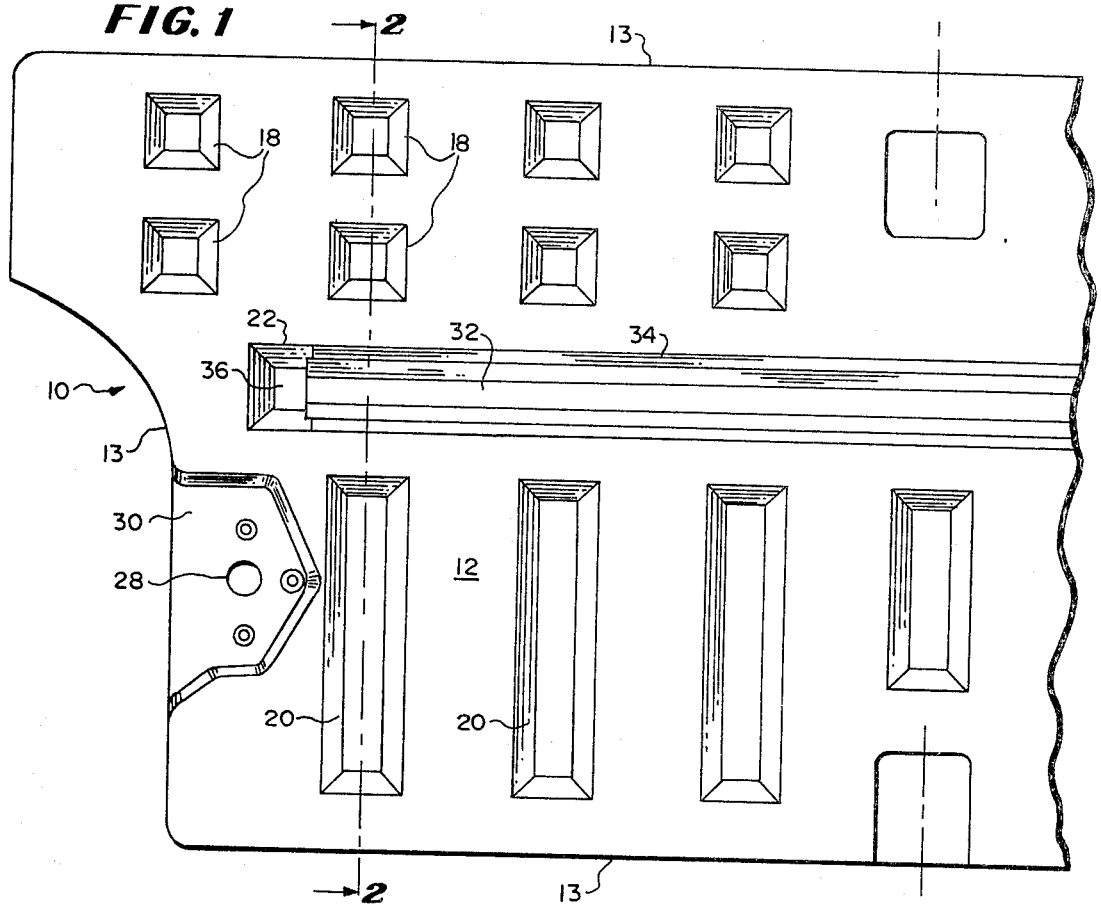
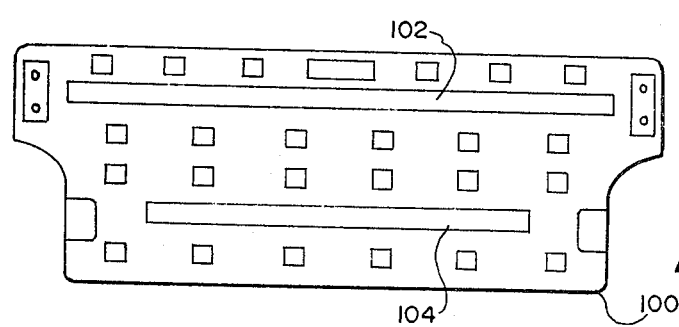
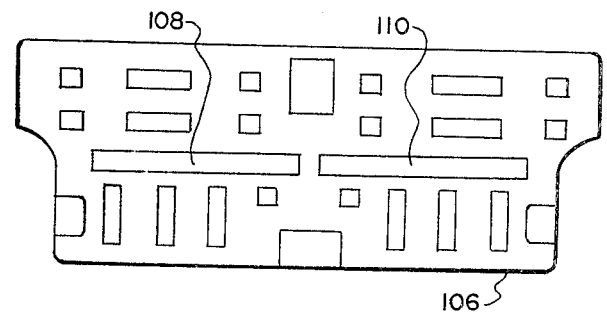

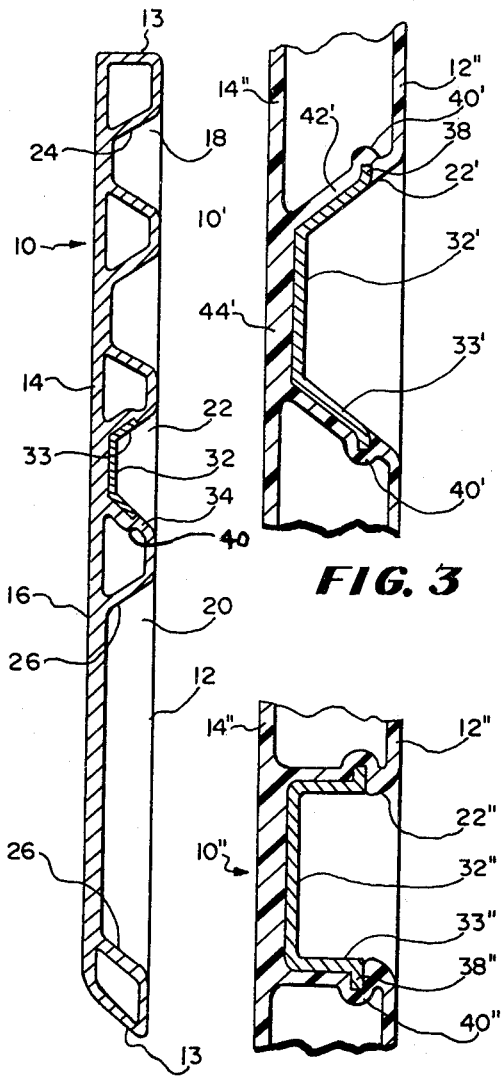
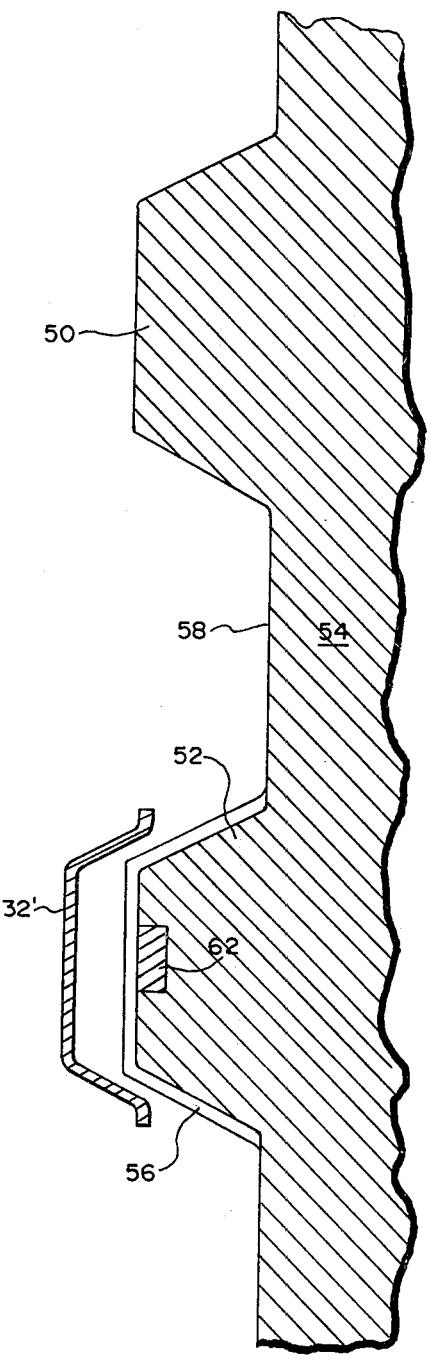
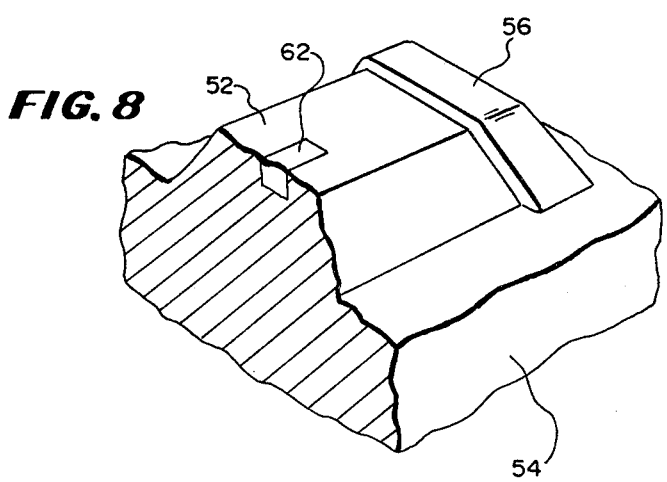

FOLD DOWN MULTI-PURPOSE VEHICLE SEAT BACK CORE WITH INMOLDED METAL REENFORCING MEMBER

CROSS REFERENCE TO COPENDING APPLICATION

This is a continuation-in-part of an application having the title: "FOLD DOWN MULTI-PURPOSE VEHICLE SEAT BACK CORE OR THE LIKE AUTOMOTIVE STRUCTURAL MEMBER", Ser. No. 845,845, filed Oct. 27, 1977 by the same applicants and assigned to the same assignee now U.S. Pat. No. 4,142,757.

This application incorporates the copending application above identified by reference.

FIELD AND BACKGROUND OF THE INVENTION

The copending application Ser. No. 845,845 is incorporated herein by reference. The field and background of the invention herein are the same as in the copending application but for the aspect which is mentioned below. The disclosure of the copending application is considered also included herein.

The seat back core of the copending application is intended to deflect under pressure which gives it great strength, the flexure being effected by resilience and being followed by recovery. Metal cores will assume permanent set if deflected.

Deflection increases with the length of the seat back core and in the cores intended for vehicles larger than the so-called compact cars this deflection may be undesirable. Even in smaller vehicles it may be desired to limit the deflection or prevent it entirely.

The invention solves these problems by the use of a relatively stiff reenforcing steel member that is incorporated into the core.

Given a core that is constructed in accordance with the teachings of the copending application, securing a reenforcing member to the core by suitable fastening means such as bolts passing through the core and clamping the member in place would be the obvious way of attaching the bar. This requires additional operations, weakens the core and may not have the desired effect because of necessity it is fastened at specific points.

The invention utilizes a method of making the core which is not obvious and which results in the inclusion of a steel structure member that is completely married with the core along its entire length. The bar is installed into the mold before the molding process takes place so that the plastic material flows around the bar and locks it in position. This cannot be done normally because of the difference between the modulus of shrinking of the plastic and the modulus of expansion and contraction of steel. The solution by the invention is an exquisite one that considers the structure of the resulting core and the manner in which the steel member is disposed in the core.

In the blow-molding of relatively large elongate members such as the seat core of the invention, shrinkage occurs to a high degree in the direction in which parison has been formed. Logically the parison is blown in the long dimension of the seat core. The shrinkage resulting during the curing of the molded object can be as much as 0.018 inch for each inch of length. Considering that a typical seat core will extend across the interior of a vehicle cab and have a length of 50 inches and more, the shrinkage can amount to nine tenths of an inch. Steel expands with heat and contracts with cold, but the contraction during the molding process is insufficient to match the shrinking of the resin.

Since it is essential that the steel reenforcing member be locked into the seat core, the problem of preventing the core from bowing seems insurmountable. According to the invention, the construction of the reenforcing member and the manner in which it is placed in the mold during the molding process obviates this problem by permitting the member to slide relative to the seat core during curing.

Prior art which is known comprises the references cited during the prosecution of the copending application and others which are mentioned in the specification of the said copending application. These include the following:

| | | | |
|---|---|---|---|
| 3,669,496 | Chisholm | June 13, 1972 | Class 297/Dig. 2 |
| 3,334,941 | Krasinski et al | Aug. 8, 1967 | Class 296/66 |
| 3,317,238 | Smoll | May 2, 1967 | Class 296/69 |
| 3,742,995 | Confer et al | July 3, 1973 | Class 150/.5 |
| 3,705,931 | Confer et al | Dec. 12, 1972 | Class 264/89 |
| 3,869,239 | Confer | Nov. 30, 1972 | Class 425/302 B |

SUMMARY OF THE INVENTION

A seat back core for a vehicle having a fold down seat which is required to serve as a load floor in which the core is blow-molded and formed as a unitary member having a pair or parallel walls spaced apart and connected by means of tying links that extend generally throughout the area of the load floor on the interior thereof and are formed during the molding process. There is a peripheral wall around the core and the core has means for enabling the securement of hardware thereto.

In order to provide for additional rigidity and strength, a channel-shaped steel bar is incorporated into the mold at the time that the core is being blow-molded and is locked in place during this process. The bar is arranged in the direction of the maximum shrinkage of the core and is disposed in a groove so that it can slide slightly during curing of the resin and will not result in the core being bowed as it comes out of the mold.

Different structures of the steel bar are used. The bar is locked in place permanently during the molding process.

BRIEF DESCRIPTION OF THE DRAWINGS

FIG. 1 is a fragmentary top plan view of a seat back core constructed in accordance with the invention;

FIG. 1 is a sectional view through the seat back core of FIG. 1 along the line 2—2 and in the indicated direction;

FIG. 2 is an enlarged fragmentary sectional view taken generally in the same manner as FIG. 2 but showing a modified form of the invention;

FIG. 4 is similar to FIG. 3 but of still another modified form of the invention;

FIG. 5 is a diagrammatic top plan view of a seat back core of modified form and showing the manner of mounting two steel reenforcement members in the core;

FIG. 6 is a diagrammatic top plan view similar to that of FIG. 5 but showing another arrangement for mounting the steel reenforcement members;

FIG. 7 is a fragmentary sectional view through one part of a mold for blow-molding a seat back core showing the construction of molding surface of the part for carrying a reenforcing member and showing the member in exploded disposition as it is being installed into the mold part; and FIG. 8 is a fragmentary perspective view of the mold projection at one end thereof showing the construction to enable the reenforcing member to slide during the curing of the seat back core.

DESCRIPTION OF THE PREFERRED EMBODIMENTS

The invention comprises the seat back core of the copending application but with a reenforcing steel structure molded into the core permanently during the molding process. The invention also includes the process for making such a seat core.

The details of the construction and the function of the several parts of the basic seat core are contained in the copending application which has been incorporated herein by reference. The structure which is necessary to be explained for the best disclosure of the invention will be repeated briefly herein.

In FIG. 1 and its sectional view in FIG. 2 are shown a seat back core 10 which is blow-molded in the manner described generally in the copending application and more in detail herein. The particular structure 10 has a front wall 12 provided with indentations of several types and a planar rear wall 14. The front and rear walls are connected by a peripheral wall 13 all around. The rear surface 16 is plain in this example.

The indentations include frusto-pyramidal indentations at 18 along the upper edge, transverse elongate rectangular indentations at 20, and an elongate rectangular indentation 22 which extends throughout the majority of the length of the core 10. All indentations are tapered towards their bottoms and each results in a doubled thickness of the plastic walls 12 and 14 where they come together and are welded in place during the molding process as explained in the copending application.

These indentations all provide the connecting links which tie the walls 12 and 14 together, a typical tying link being indicated at 24 and being formed by the surrounding walls of the indentation 18. The tying links of different shaped indentations will generally follow the shape of the indentation. Thus, the tying links of the rectangular indentations 20 comprise rectangular formations 26. There may be smaller indentations such as at 28 providing smaller tying links at locations 30 where hardware is intended to be secured.

The indentation 22 extends substantially along the entire length of the seat core 10 and it has a steel reenforcing member 32 locked into its side walls, having been molded into core 10 at the time of its formation. The member 32 is of channel construction and may be stamped or bent from cold rolled sheet steel of 14 gauge steel (0.0747' thick). The channel side arms 33 are bent outward as best seen in FIG. 2 to conform closely to the tapered configuration of the indentation 22. The dimensions are chosen so that the depth of the channel member 32 is substantially less than the depth of the indentation 22 so that when molded there will be plastic material engaging along the free edges of the channel arms 33. This results in the locking engagement which prevents removal of the reenforcing member 32.

In a practical example the depth of the indentation 22 measured along the angled side walls was about seven eighths inch while the equivalent dimension of the side arms 33 of the reenforcing member was about one half inch, resulting in a blocking bead or formation 34 about three eighths of an inch wide along the entire length of the reenforcing member 32.

It will be noted that the length of the indentation 22 is substantially greated than the length of the member 32 so that there is a free portion at 36 formed at opposite ends of the indentation 22. This space is provided primarily to enable the sliding movement of the member 32 during the curing of the core 10 which occurs primarily after it has been removed from the mold and is cooling. This freedom to slide prevents the reenforcing member from being forced against any part of the seat core 10 which could result in bowing of the core or separating the walls.

In FIGS. 3 and 4 two different constructions are shown. The core 10' of FIG. 3 uses a reenforcing member 32' which is similar in construction to the member 32 in that it has the outwardly bent channel arms 33' to conform to the walls of the indentation 22' but in addition has small lips or flanges 38 along the free edges of the channel arms. With this form of reenforcing member, when molded there will be a more positive locking action because of the formation of the pockets 40 by plastic that tries to follow the contours of the member 32'. It should be recalled that in blow-molding the parison is a tube of plastic having a substantially uniform wall throughout and when that wall is blown into a mold it tries to follow every contour of the mold. As will be explained, during the molding process the reenforcing member 32' is acting as an integral part of the mold and the parison wall will envelop the same and produce the locking pockets 40 on opposite edges of the member 32'.

The core 10" of FIG. 4 uses a reenforcing channel member 32" that has substantially right angle arms 33 each provided with a small lip 38' that is locked into a pocket 40" during the molding of the core 10" in the same manner as the core 10'.

FIGS. 3 and 4 are on a larger scale than FIG. 2 so that it is more readily seen that the tying links produced by the indentations are formed at locations where the bottom ends of the tying links will weld to the opposite wall and form a double thickness thereat. Thus, the indentation 22' produced an elongate tying link 32' that extends the majority of the length of the core 10' and has the thickened portion 44' at its base.

In molding the cores 10, 10' and 10" where, for example, all of the indentations are formed in one wall of the core and the other is substantially unindented, the mold will be made out of two parts, one of which is flat-faced and the other of which has projections. In FIGS. 7 and 8 there are illustrated fragments of a mold which has the projections. In the views, the projection 50 is intended for one of the indentations 18, for example, and the projection 52 is intended for the indentation 22 or 22'. These are formed solid with the body of the mold 54 and will be of suitable configuration and dimensions to provide the desired indentations.

The projection 52 has the same contour and dimensions at its ends as the projection 50 thereby providing for the indentation ends to produce the free space at 36 mentioned above and indicated in FIG. 1. This forms a slight protuberance 56 at each end of the projection 52. The depth of the protuberance 56 is approximately the same as the thickness of the channel shaped reenforcing member which is to be mounted to the projection 52.

In fabricating the mold part 54, the projection 52 can be cast or machined from the block or may be separately formed and attached by machine screws. If removable, different forms of projections can be used with the same mold base 54.

The mold base 54 is intended to accommodate the reenforcing member 32 or 32' which is laid onto the cutaway portion shown on the projection 52 and held in place as the mold is used. Obviously a new channel shaped reenforcing member will be used each time that a seat core is formed since the act of molding locks the reenforcing member to the core. In FIG. 7, a reenforcing member 32' of the construction shown in FIG. 3 is poised to be mounted on the projection 52. It is dimensioned so that it will not reach the upper surface 58 of the base 54. Its length is such that it will fit between the end protuberances 56 so that when the seat core is molded, there will be nothing to prevent the channel shaped reenforcing member 32' from freely sliding endwise. The protuberance 56 will form the end of the indentation 22 or 22' as deep as the normal indentations 20 and hence leave the space 36 for movement of the reenforcing member 32 or 32'.

The maximum shrinking of the seat core will occur along its length and hence it is best that the reenforcing member be disposed to be able to slide along this dimension. Actually, the utility of the reenforcing member is maximum when disposed lengthwise of the seat core.

The securement or mounting of the reenforcing member 32, 32' or 32" to the mold part before bringing the parts together is capable of being achieved by different means. Self-adhering tape may be used under the members; vacuum openings may be utilized to hold them in place; and a simple magnetic arrangement could be used. In FIG. 7, permanent magnets 62 may be mounted along the length of the projection 52 flush with the upper surface to hold the reenforcing member 32 or 32' in place during the molding process.

The reenforcing members 32, 32' and 32" are intended to prevent flexure of the seat core and to strengthen the same. Different arrangements can be used for different purposes.

In FIG. 5 there is illustrated a core 100 which has two reenforcing members 102 and 104 molded therein to provide great strength and stiffness.

In FIG. 6 there is illustrated a seat core 106 in which there are two reenforcing members 108 and 110 arranged end to end but separated in the center. In this case, the only place where flexure can take place is in the center; hence the core 106 will be permitted to flex but only to a limited extent.

It is pointed out that the addition of metal members to the blow-molded seat core does not add substantially to the cost thereof because once the mold has been constructed, it requires only a few seconds to mount the reenforcing member into the mold before bringing the parts together in the molding machine. This is not the same effect as fabricating the conventional sheet metal seat core because, when the seat core of the invention is withdrawn from the mold, it is complete but for the attachment of hardware. The reenforcing members may be drilled, tapped or provided with studs and the like (entering suitable sockets formed to clear in the mold base) so that hardware may be attached directly thereto if desired when assembling the same to the vehicle.

Variations are capable of being made without departing from the spirit or scope of the invention as defined in the appended claims.

What is desired to secure by Letters Patent of the United States is:

1. A load floor for the core of a fold down vehicle seat or the like automotive structural member comprising
   A. a hollow blow-molded member of synthetic resin whose overall thickness is substantially less than its size and which is generally rectangular in configuration,
   B. including a pair of generally parallel walls extending over substantially all of said member and having a peripheral connecting wall joining them around the member,
   C. a plurality of tying links extending between the parallel walls on the interior of the member and comprising:
      i. each such link being integral with a first parallel wall and comprising an indented formation having a bottom which is generally parallel with said first parallel wall from which the indented formation extends,
      ii. the depth of the indented formation being such as to carry the said bottom into engagement with the interior surface of the second and opposite parallel wall and forming a web therewith which is approximately twice the thickness of either of the parallel walls,
      iii. the indented formation being produced during the blow-molding operation whereby the said bottom and the said portion of the respective parallel walls are permanently welded together,
   D. said tying links being distributed throughout the entire area of said member whereby to rigidify and strengthen said member throughout its area to serve as weight support,
   E. said member having means to accommodate if not enable securement of automotive hardware, and
   F. at least one of said indentations extending a substantial distance along the length of said load floor and having a channel shaped reenforcing member of metal locked to the bottom and sides thereof.

2. The structural member as claimed in claim 1 in which at least the last-mentioned indentation has its bottom engaged with the unindented interior surface of the opposite parallel wall.

3. The structural member as claimed in claim 1 in which the channel shaped reenforcing member has straight side arms angled outward.

4. The structural member as claimed in claim 3 in which the free edges of the side arms have flanges thereon and the side walls of the said last-mentioned indentation have pockets confining said flanges.

5. The structural member as claimed in claim 1 in which the length of the last-mentioned indentation is greater than the length of the reenforcing member leaving a free space to permit sliding of the reinforcing member when the structural member cools after molding.

6. A load floor for the core of a fold down vehicle seat which comprises:
   A. a hollow blow-molded member of synthetic resin whose overall thickness is substantially less than its size and which is generally rectangular in configuration,
   B. including a pair of generally parallel walls extending over substantially all of said member and having a peripheral connecting wall joining them around the member,
   C. a plurality of indentations in at least one parallel wall spaced throughout the area of the member and each forming a tying link extending between the parallel walls, each tying link comprising the walls of the indentation and having the bottom of the indentation welded to the interior of the wall opposite that one from which it is indented, D. one indentation extending along the length of the member having a cross-section comprising a flat bottom and angled outward walls and E. a sheet metal reenforcing member of generally channel construction conforming to and locked into the bottom of the indentation and somewhat less than coextensive in length therewith.

7. The load floor as claimed in claim 6 in which the free edges of the channel arms of the reenforcing member have outwardly extending flanges engaged in pockets formed in the side walls of the one indentation.

8. The load floor as claimed in claim 6 in which the ends of the one indentation are provided with areas to enable sliding of the reenforcing member when the load floor cools after molding.

9. The load floor as claimed in claim 6 in which the depth dimension of the side walls of the one indentation are greater than the equivalent dimension of the channel arms of the reenforcing member whereby to provide blocking formations along the length of the one indentation preventing removal of the reenforcing member.

10. The load floor as claimed in claim 7 in which the depth dimension of the side walls of the indentation are greater than the equivalent dimension of the channel arms of the reenforcing member.

11. The load floor as claimed in claim 6 in which there is a plurality of reenforcing members, each in a separate indentation.

12. The load floor as claimed in claim 6 in which there is a plurality of reenforcing members arranged end to end in said one indentation.

* * * * *